(12) United States Patent
Corsini et al.

(10) Patent No.: US 10,766,192 B2
(45) Date of Patent: Sep. 8, 2020

(54) LASER 3D PRINTER

(71) Applicant: 3D4MEC SRL, Sasso Marconi (IT)

(72) Inventors: Giuseppe Corsini, Sasso Marconi (IT); Gabriele Carloni, Bologna (IT)

(73) Assignee: 3D4MEC SRL, Sasso Marconi (IT)

( * ) Notice: Subject to any disclaimer, the term of this patent is extended or adjusted under 35 U.S.C. 154(b) by 180 days.

(21) Appl. No.: 15/822,990

(22) Filed: Nov. 27, 2017

(65) Prior Publication Data

US 2019/0160748 A1 May 30, 2019

(51) Int. Cl.
| | | |
|---|---|---|
| *B29C 64/245* | (2017.01) | |
| *B29C 64/153* | (2017.01) | |
| *B29C 64/205* | (2017.01) | |
| *B29C 64/268* | (2017.01) | |
| *B29C 64/321* | (2017.01) | |
| *B29C 64/357* | (2017.01) | |
| *B33Y 40/00* | (2020.01) | |
| *B33Y 30/00* | (2015.01) | |

(52) U.S. Cl.
CPC .......... *B29C 64/245* (2017.08); *B29C 64/153* (2017.08); *B29C 64/205* (2017.08); *B29C 64/321* (2017.08); *B29C 64/357* (2017.08); *B29C 64/268* (2017.08); *B33Y 30/00* (2014.12); *B33Y 40/00* (2014.12)

(58) Field of Classification Search
CPC ... B29C 64/245; B29C 64/153; B29C 64/205; B29C 64/268; B29C 64/357; B29C 64/321; B22F 3/004; B22F 3/105; B22F 3/1055
See application file for complete search history.

(56) References Cited

U.S. PATENT DOCUMENTS

| 2001/0045678 | A1* | 11/2001 | Kubo | B29C 41/36 264/37.29 |
| 2007/0026145 | A1* | 2/2007 | Lindemann | B29C 64/153 427/248.1 |
| 2016/0101469 | A1* | 4/2016 | Kawada | B22F 3/1007 425/78 |

FOREIGN PATENT DOCUMENTS

| WO | WO 2005/025780 | 3/2005 |
| WO | WO 2016/133456 | 8/2016 |

* cited by examiner

*Primary Examiner* — Joseph S Del Sole
*Assistant Examiner* — Mohamed K Ahmed Ali
(74) *Attorney, Agent, or Firm* — Leason Ellis LLP

(57) ABSTRACT

A laser 3D printer presents a tubular compartment; a lifting platform engaged in a sliding manner in the tubular compartment; a feeding unit for feeding a powdered material onto the lifting platform; a laser printing head for sintering the powdered material laid on the lifting platform; and a collection chamber, which extends about at least part of the tubular compartment and is connected to the tubular compartment via at least one opening made through a side wall of the tubular compartment itself.

10 Claims, 4 Drawing Sheets

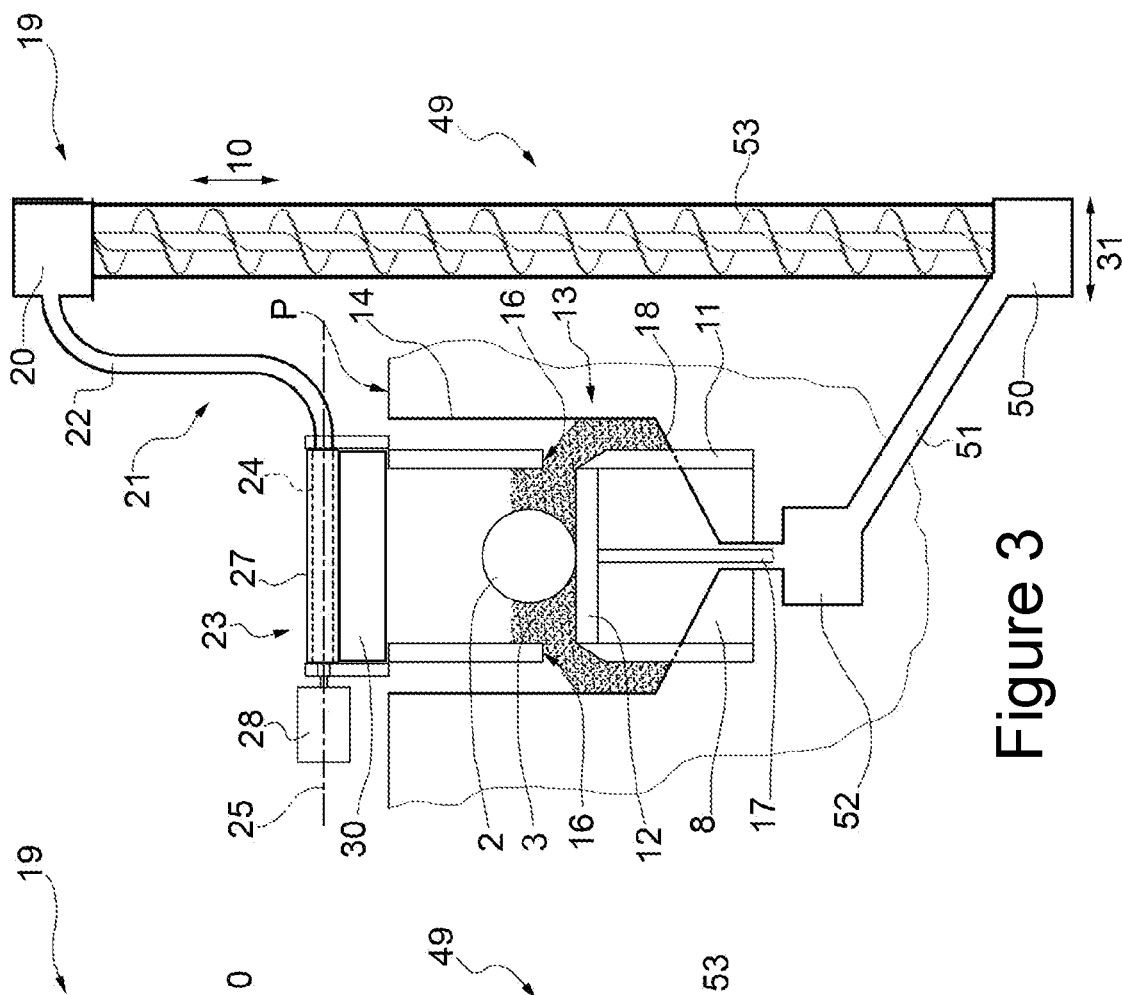
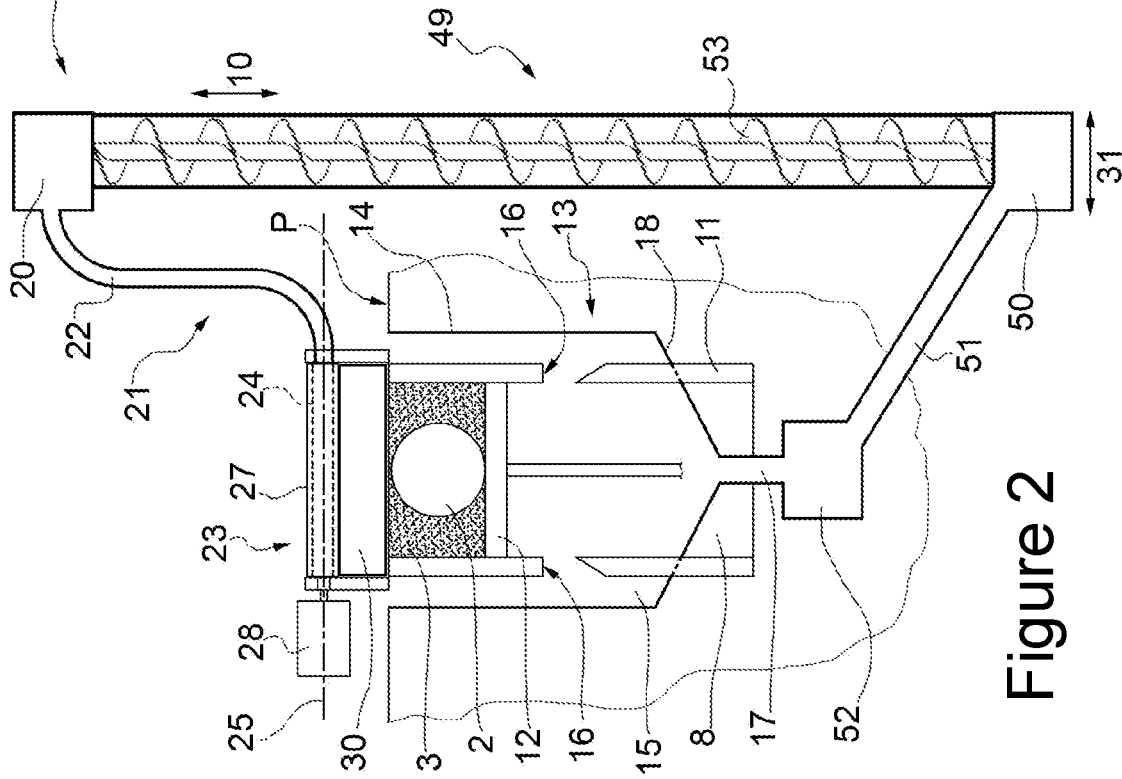
Figure 3
Figure 2

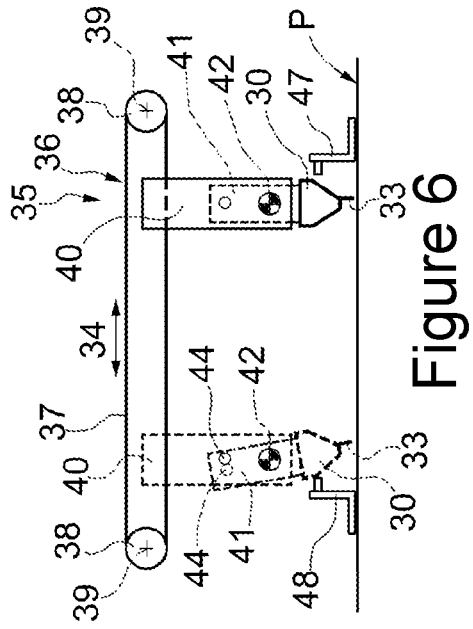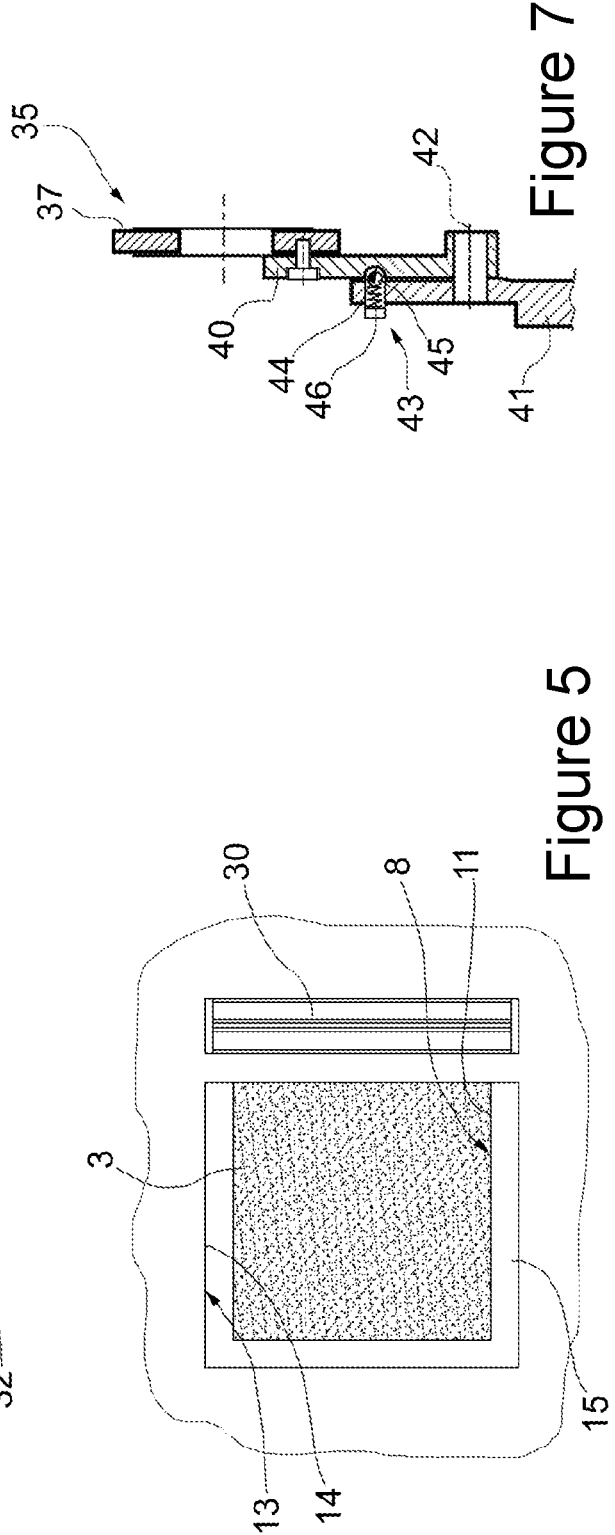

LASER 3D PRINTER

CROSS-REFERENCE TO RELATED APPLICATIONS

This application is related to Italian Patent Application No. 102016000068807 filed on Jul. 1, 2016, the disclosure of which is incorporated by reference.

TECHNICAL FIELD

The present invention relates to a laser 3D printer.

In particular, the present invention relates to a laser 3D printer of the type comprising a tubular compartment having a substantially vertical longitudinal axis; a lifting platform engaged in a sliding manner in the tubular compartment; a feeding unit for feeding a powdered material onto the lifting platform; a laser printing head for sintering the powdered material laid on the lifting platform; and a collection chamber, which extends around at least part of the tubular compartment.

The lifting platform is progressively lowered to enable the feeding unit to feed each time a new layer of powdered material onto the lifting platform at the end of each operating cycle of the laser printing head.

At the end of processing, the lifting platform is raised into a position corresponding to an open top end of the tubular compartment to enable recovery of the article produced.

Raising of the lifting platform at the end of processing involves dispersion of the residual powdered material into the space surrounding the tubular compartment.

BACKGROUND OF THE INVENTION

Known laser 3D printers of the type described above present some drawbacks mainly resulting from the fact that recovery of the residual powdered material dispersed at the end of processing is performed by the operating staff using a suction device and hence entails the exposure of the staff to the powdered material itself.

SUMMARY OF THE INVENTION

The aim of the present invention is to provide a laser 3D printer that will be free from the drawbacks described above and that will be simple and economically advantageous to produce.

According to the present invention a laser 3D printer is provided as specified in the annexed claims.

BRIEF DESCRIPTION OF THE DRAWINGS

The present invention will now be described with reference to the annexed drawings, which illustrate a non-limiting example of embodiment thereof and in which:

FIGS. 2 and 3 are two schematic lateral views, with parts removed for reasons of clarity, of a first detail of the laser 3D printer of FIG. 1 illustrated in two different operative positions;

FIG. 4 is a schematic perspective view of a first detail of FIGS. 2 and 3;

FIG. 5 is a schematic plan view, with parts removed for reasons of clarity, of a second detail of FIGS. 2 and 3;

FIG. 6 is a schematic lateral view, with parts removed for reasons of clarity, of a second detail of the laser 3D printer of FIG. 1 illustrated in two different operative positions;

FIG. 7 is a schematic lateral view, with parts in cross section and parts removed for reasons of clarity, of a detail of FIG. 6;

DETAILED DESCRIPTION OF THE INVENTION

Figure 1:
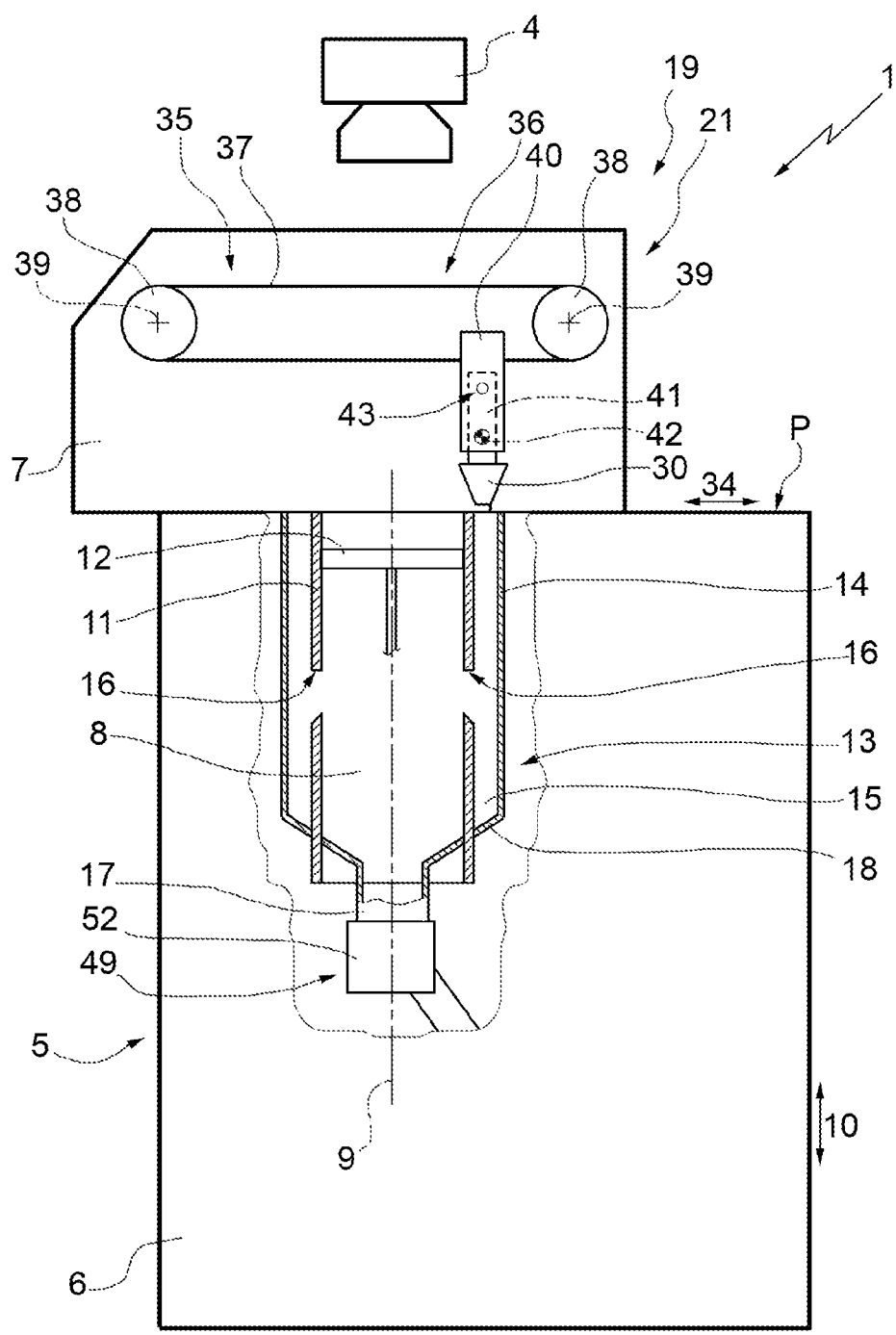
FIG. 1 is a schematic lateral view, with parts in cross-sectional view and parts removed for reasons of clarity, of a preferred embodiment of the laser 3D printer according to the present invention.
Figure 8:
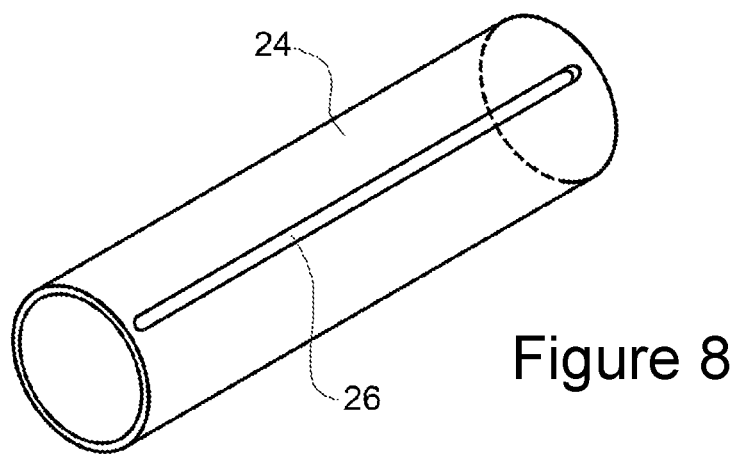
FIG. 8 is a schematic perspective view of a third detail of FIGS. 2 and 3.
Figure 9:
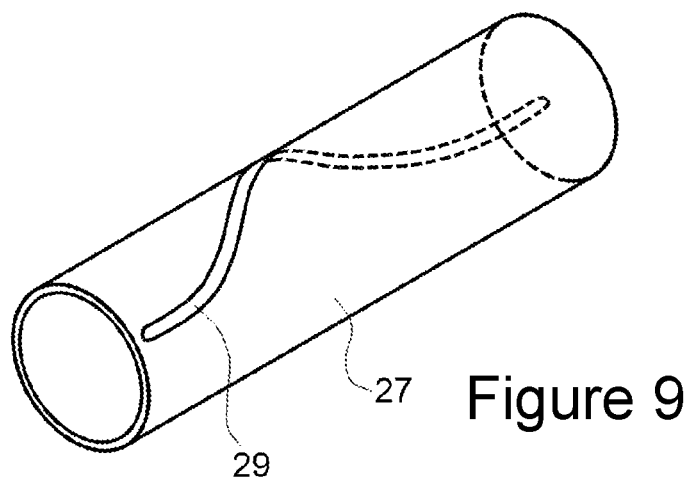
FIG. 9 is a schematic perspective view of a fourth detail of FIGS. 2 and 3.

With reference to FIGS. 1, 2, and 3, designated as a whole by 1 is a laser 3D printer for producing three-dimensional objects 2 by sintering of a powdered material 3 using a laser head 4.

The printer 1 comprises a supporting frame 5, which in turn comprises a bottom box-shaped body 6 and a top box-shaped body 7 connected together along a substantially horizontal plane P of separation.

The body 6 houses within it a tubular compartment 8, which has a longitudinal axis 9 parallel to a substantially vertical direction 10 perpendicular to the plane P, extends downwards starting from the plane P, and has a cross section having a substantially square shape.

The compartment 8 is limited by a side wall 11 engaged in a sliding manner by a lifting platform 12, which extends perpendicular to the direction 10 and is mobile along the compartment 8 in the direction 10 itself under the thrust of a driving device (known and not illustrated).

The platform 12 is connected to a known vibrating device (not illustrated) designed to impart on the platform 12 itself vibrations according to a given law.

The compartment 8 is inserted within a collection chamber 13, which extends downwards starting from the plane P, moreover extends around the wall 11, and is limited by a side wall 14.

The walls 11, 14 define between them an annular channel 15, which communicates with the compartment 8 via a plurality of openings 16, which are made in an intermediate point of the wall 11 and are distributed about the axis 9.

According to what is illustrated in FIG. 5, the channel 15 has a substantially U-shaped inlet section, and is closed by the plane P on a fourth side thereof.

The chamber 13 has an outlet 17 for the material 3 from the channel 15 and is limited by a bottom wall 18, which is configured for feeding the material 3 towards the outlet 17 and in particular is inclined downwards.

The printer 1 further comprises a feeding unit 19 for feeding the material 3 onto the platform 12.

The unit 19 comprises a top tank 20 mounted on the body 7, and a dispensing and distribution unit 21 mounted above the plane P and connected to the tank 20 via a vibrating feeding duct 22.

With reference to FIGS. 2, 3, 8, and 9, the unit 21 comprises a dispensing device 23, in turn comprising a fixed inner pipe 24, which has a longitudinal axis 25 parallel to the plane P and transverse to the direction 10, is coupled in an angularly fixed way to the frame 5, and communicates with the duct 22.

The pipe 24 has a slit 26, which is made through the pipe 24 parallel to the axis 25, and faces the plane P.

The device 23 further comprises a rotating outer pipe 27, which extends around the pipe 24 coaxially thereto about the axis 25 and is coupled in a rotating manner to the pipe 24 for rotating, with respect to the pipe 24 and under the thrust of a driving device 28, about the axis 25 itself.

The pipe 27 has a slit 29, which is made through the pipe 27 and winds in a helix about the axis 25 according to an angle of substantially 180°.

According to what is illustrated in FIGS. 2, 3, and 4, the unit 21 further comprises a distributor 30, which has the shape of a hopper converging towards the plane P, extends in a direction 31 parallel to the axis 25, and is mounted between the plane P and the dispensing device 23.

The distributor 30 is limited underneath by a plane face 32, and is provided with a spatula 33, which extends in the direction 31, and projects downwards from the face 32 itself.

The distributor 30 is mobile, with respect to the dispensing device 23 and above the compartment 8, in a feeding direction 34 parallel to the plane P and orthogonal to the directions 10 and 31 with a reciprocating rectilinear motion comprising a forward stroke and a return stroke.

In this connection, it should be pointed out that, at the end of the return stroke, the distributor 30 sets itself underneath the dispensing device 23.

The distributor 30 is displaced in the direction 34 by a driving device 35 comprising a belt conveyor 36, in turn comprising a belt 37 wound in a loop about a pair of pulleys 38, one of which is motor-driven in an intermittent way and which are mounted so as to turn about respective rotation axes 39 parallel to one another and to the direction 31.

The device 35 further comprises an engagement plate 40, which is fixed to the belt 37, and carries connected thereto a rocker 41 projecting upwards from the distributor 30.

The rocker 41 is hinged to the plate 40 so as to turn, with respect to the plate 40, about a pivot axis 42 parallel to the direction 31 between a lowered, operating, position (illustrated with a solid line in FIG. 6), in which the plane of vertical symmetry of the distributor 30 is perpendicular to the plane P, and a raised, resting, position (illustrated with a dashed line in FIG. 6), in which the plane of vertical symmetry of the distributor 30 is inclined with respect to the plane P and the spatula 33 is raised with respect to the plane P itself.

With reference to FIGS. 6 and 7, the distributor 30 is locked in its operating position and in its resting position by a locking device 43 comprising a pair of slots 44, which are provided in the plate 40 and are circumferentially aligned with respect to one another about the axis 42.

The device 43 further comprises an engagement ball 45, which is mounted in a top arm of the rocker 41 and is displaced into a locking position, in which the ball 45 engages one of the slots 44, and normally kept therein, by a spring 46 set between the rocker 41 and the ball 45 itself.

At the end of the return stroke, the distributor 30 is displaced into its operating position by a first end-of-travel element 47 designed to come into contact with a bottom arm of the rocker 41.

At the end of the forward stroke, the distributor is displaced into its resting position by a second end-of-travel element 48 designed to come into contact with the bottom arm of the rocker 41.

Finally, the printer 1 comprises a device 49 for recycling the material 3 collected in the chamber 13 and fed to the outlet 17.

The device 49 comprises a bottom tank 50 set underneath the outlet 17; a chute 51, which extends between the outlet 17 and the tank 50; a filter 52 mounted at the inlet of the chute 51; and an auger 53 designed to transfer the material 3 from the tank 50 to the tank 20.

Operation of the printer 1 will now be described starting from an instant in which:

the platform 12 is set at a distance from the plane P that is approximately equal to the thickness of a layer of material 3; and the distributor 30 is set in its operating position underneath the dispensing device 23.

The rotating outer pipe 27 is set in rotation about the axis 25 by the driving device 28 so as to enable the slit 29 to align radially with the slit 26 and define an outlet opening (not illustrated) for the material 3 from the dispensing device 23.

Since the slit 29 winds in a helix about the axis 25 according to an angle substantially equal to 180°, the aforesaid outlet opening (not illustrated) for exit of the material 3 from the device 23 progressively advances along the axis 25 so as to deposit a homogeneous layer of material 3 within the distributor 30.

At the end of a rotation through 180° of the pipe 27 about the axis 25, the slit 29 disengages the slit 26, and the outlet opening (not illustrated) is closed during the next rotation through 180° of the pipe 27 itself.

Once the material 3 has been fed into the distributor 30, the distributor 30 is displaced above the compartment 8 with its forward stroke in the direction 34 so as to distribute the material 3 over the platform 12.

At the end of its forward stroke, the distributor 30 is first displaced into its resting position by the element 48, and is then displaced above the compartment 8 in its return stroke, without interfering with the material 3.

At the end of the return stroke, the distributor 30 is again displaced into its operating position by the element 47.

The above operating cycle of the dispensing and distribution unit 21 is repeated and combined with lowering of the platform 12 so as to create an object 2.

During production of the object 2, the platform 12 is always set above the openings 16.

Once the object 2 is obtained, the platform 12 is lowered below the openings 16 and set in vibration so as to enable the material 3 to exit from the compartment 8, enter the chamber 13, and proceed towards the outlet 17.

The material 3 is fed from the outlet 17 through the filter 52, along the chute 51, and into the tank 50, and is finally again fed into the tank 20 by the auger 53.

The printer 1 consequently presents the advantage that the powdered material 3 is partially used to make the object 2 and partially recirculated in the tank 20 without being dispersed in the environment surrounding the compartment 8 and without requiring recovery operations of the residual material 3 by the operating staff.

The invention claimed is:

1. A laser 3D printer comprising a tubular compartment, which has a vertical longitudinal axis and is limited by a first side wall, which extends about the longitudinal axis itself; a lifting platform engaged in a sliding manner in the tubular compartment; a feeding unit for feeding a powdered material onto the lifting platform; a laser printing head for sintering the powdered material laid on the lifting platform; and a collection chamber, which extends about the first side wall of the tubular compartment, has an outlet for the powdered material, and is limited by a second side wall and a bottom wall configured so as to feed the powdered material towards the outlet itself; the tubular compartment having at least one opening made through the first side wall for connecting together the tubular compartment and the collection chamber; and being characterized in that the tubular compartment is inserted within the collection chamber so that the outlet is located beneath the tubular compartment, wherein an annular channel is defined between the first side wall and the second side wall and communicates with the tubular compartment via the at least one opening of the first side wall, the annular channel having a substantially U-shaped inlet section and is closed by a plane (P) on a fourth side thereof, wherein the bottom wall of the collection chamber is inclined inwardly and downwardly towards the outlet for centrally feeding the powered material to the outlet.

2. The laser 3D printer according to claim 1, and further comprising a vibrating device for imparting on the lifting platform vibrations according to a given law.

3. The laser 3D printer according to claim 1, wherein the side wall is provided with a plurality of openings distributed about the longitudinal axis.

4. The laser 3D printer according to claim 1, and further comprising a recycling system for recycling the powdered material contained in the collection chamber towards the feeding unit.

5. The laser 3D printer according to claim 4, wherein the feeding unit comprises a dispensing device for feeding the powdered material onto the lifting platform, and a top tank set between the recycling system and the dispensing device itself.

6. The laser 3D printer according to claim 5, wherein the recycling system comprises a feeding device for transferring the powdered material into the top tank.

7. The laser 3D printer according to claim 6, wherein the recycling system further comprises a chute which connects together the collection chamber and the feeding device.

8. The laser 3D printer according to claim 7, wherein the recycling system further comprises a bottom tank mounted between the chute and the feeding device.

9. The laser 3D printer according to claim 1, wherein the lifting platform is mobile along the tubular compartment between a raised position, in which the lifting platform extends above the opening, and a lowered position, in which the lifting platform extends underneath the opening itself.

10. The laser 3D printer according to claim 1, wherein each opening is made in an intermediate point of the first side wall along the longitudinal axis, wherein an inclined section of the bottom wall begins to taper inwardly at a first location and terminates at a second location, each of the first location and the second location being located above a bottom edge of the tubular compartment, the inclined section leading to a bottom wall section that is parallel to the second side wall for feeding the powered material to the outlet, the bottom wall section being located both above and below the bottom edge of the tubular compartment.

* * * * *